Figure 1:
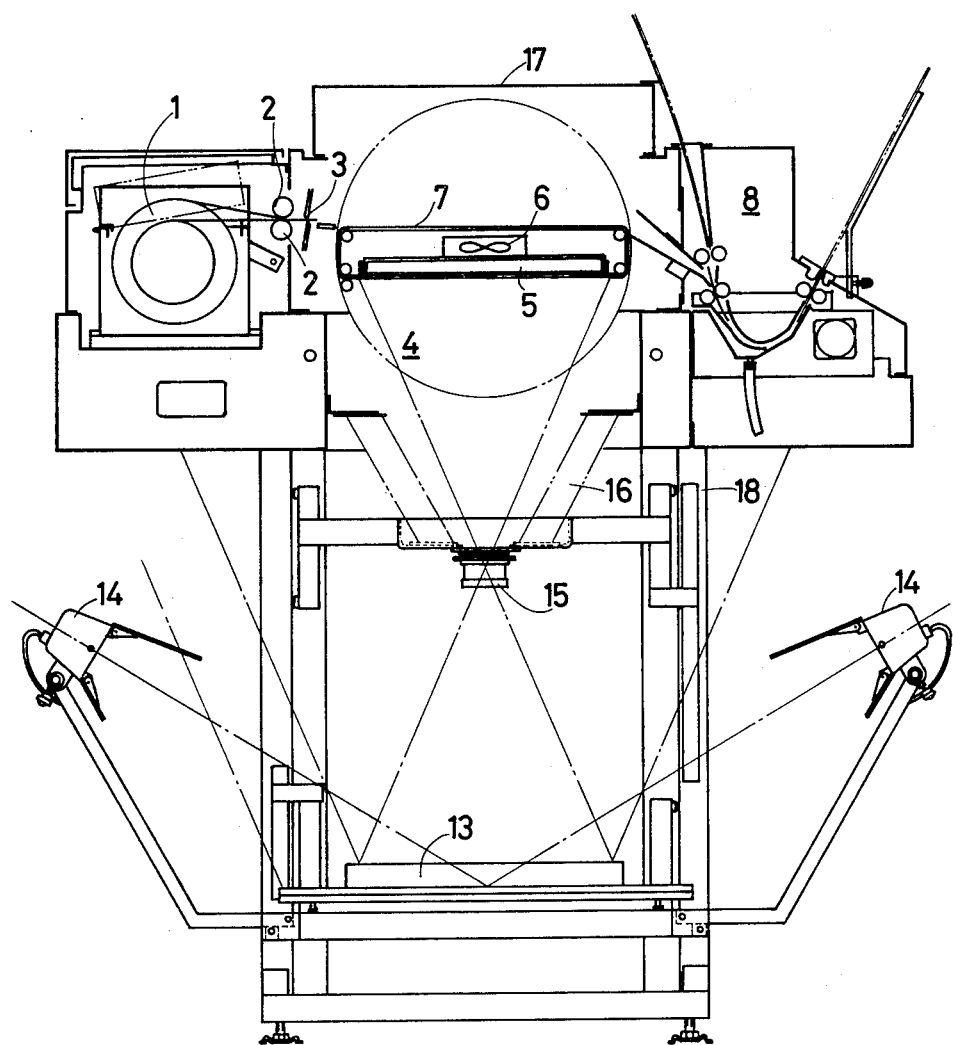

United States Patent [19]

Miyauchi

[11] Patent Number: 4,478,511

[45] Date of Patent: Oct. 23, 1984

[54] FILM DELIVERY AND POSITIONING DEVICE

[75] Inventor: Yoshio Miyauchi, Hikone, Japan

[73] Assignee: Dainippon Screen Manufacturing Co., Ltd., Kyoto, Japan

[21] Appl. No.: 400,163

[22] Filed: Jul. 20, 1982

[30] Foreign Application Priority Data

Sep. 9, 1981 [JP] Japan .................................. 56-142802

[51] Int. Cl.³ ............................................ G03B 29/00
[52] U.S. Cl. ........................................ 355/28; 355/73; 355/91
[58] Field of Search ............................. 355/23, 27–29, 355/30, 73, 91

[56] References Cited

U.S. PATENT DOCUMENTS 3,276,312 10/1966 Florsheim, Jr. et al. ............. 355/27
3,536,401 10/1970 Mason et al. ......................... 355/28

Primary Examiner—Richard A. Wintercorn
Attorney, Agent, or Firm—Millen & White

[57] ABSTRACT

A photographing station of a copying camera is disclosed comprising a film supporting surface rotatable about its axis between a first position and a second position. The surface receives and holds a predetermined length of unexposed film in the first position, turns to the second position for exposing the film and then resumes the first position to remove the exposed film for developing.

5 Claims, 2 Drawing Figures

FILM DELIVERY AND POSITIONING DEVICE

BACKGROUND OF THE INVENTION

The present invention relates to a device associated with a copying camera, capable of delivering a predetermined length of a rolled sensitive material, cutting it into said length, aligning such length with the optical axis, exposing it, and feeding the exposed sensitive material into a developing device.

Copying cameras, particularly photomechanical cameras for printing, are classified into the horizontal, vertical and upright types. For example, in an upright copying camera, since its photographing section is designed to operate with the sensitive material film surface directed downwardly, transparent glass or the like is used for the sensitive material holder, on which the sensitive material film surface is placed facing to the glass surface, and the sensitive material is exposed while being pressed from behind. There have been drawbacks in that dust and the like produced when the sensitive material is cut adhere to the glass surface, thereby lowering the quality of the photographed image, and that since it is impossible to mark the transparent glass with divisions, the cut sensitive material film cannot be correctly aligned with the optical axis. Therefore, even at present, most of the upright copying cameras are designed so that sheet films are manually set one by one, and in this kind of upright copying camera, except for a small camera for microfilms, none of its versions automated over the range from photographing to development have been popuralized.

BRIEF DESCRIPTIONS OF THE DRAWINGS

The present invention has been accomplished in view of the drawbacks described above, and an embodiment thereof will now be described with reference to the drawings.

Figure 2:
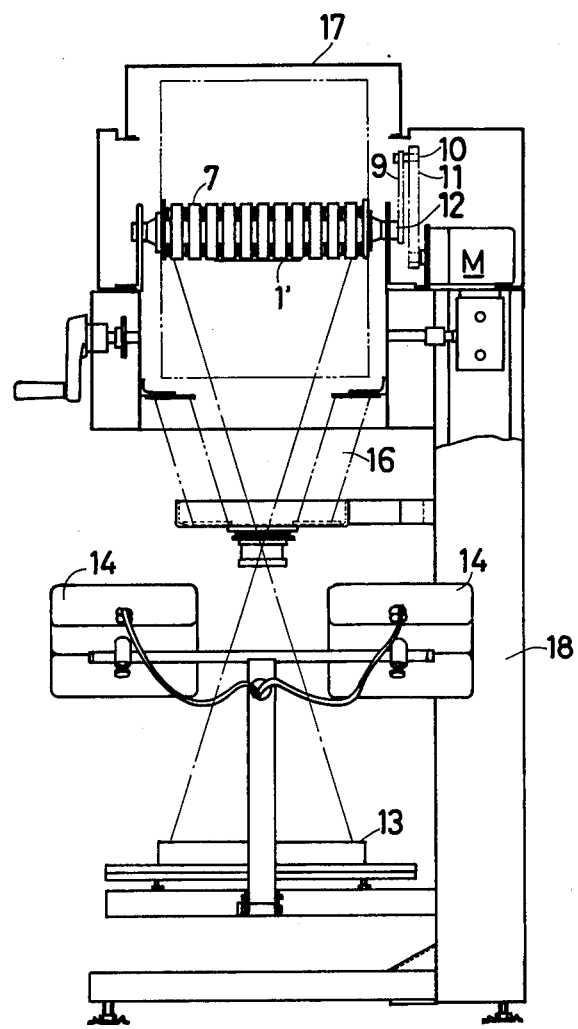

FIG. 1 is a front view including a section of the principal portion of an upright copy camera having a photographing device of the present invention incorporated therein, and FIG. 2 is a side view thereof.

DETAILED DISCUSSION OF THE INVENTION

A rolled sensitive material 1 rolled with its film surface directed outwardly (the negative roll paper width being 257 mm, for example) is delivered in successive necessary lengths by a pair of rollers 2 and 2, and cut by a cutting device 3. A revolving photographing device 4 has its suction box 5 directed upwardly waiting for the arrival of a cut sensitive material film, and fan 6 serves to hold said sensitive material film on endless belts 7 and align it on a position equivalent to the optical axis. The revolving film holder 4 has an arm 9 fixed on its rotary shaft 12 (FIG. 2), said arm having a pin 10 fixed to the front end thereof to support a spring arm 11 fixed to the rotary shaft of a reversing motor M, so that upon rotation of the reversing motor M, the film holder 4 is rotated about the axis of the rotary shaft 12. When it rotates through 180°, it is stopped by a stop (not shown) and a limiter (not shown), said revolving film holder 4 assuming an exposure-possible position. This position is shown in FIG. 1.

Upon completion of exposure, the reversing motor M is driven, and when it stops, said revolving film holder 4 reverses through 180° to resume its original position while holding the exposed sensitive material film 1', which is fed into a developing device 8 by the delivery action of the endless belt. This is one cycle of drive relating to a single exposure.

In addition, 13 denotes an original mount; 14 denotes lamps; 15 denotes a lens; 16 denotes a light shield below; 17 denotes a light shield cover and 18 denotes a frame body holding said various parts.

While the above description refers to an upright copying camera wherein the cutting, exposure and development of a rolled sensitive material are automatically performed, it goes without saying that the invention is also applicable to the horizontal type where sheets of sensitive material are set one by one.

As described above in detail, using the revolving film holder of the present invention in a copy camera enables automation ranging from the cutting of a rolled sensitive material followed by exposure to the feeding of it to the developing device. On the other hand, since no glass plate or the like is used on the photographing surface, there is no need to worry about dust or soiling on the glass plate. Further, since no glass plate is used, there is no refraction due to glass and accurate focusing is ensured.

I claim:

1. In a film delivery and positioning device in a copying camera for delivering predetermined lengths of unexposed film to a photographic station, aligning each length with the optical axis of the camera, exposing the film to light, and feeding the exposed film to a developing station, the improvement wherein said photographic station comprises:
    film holding means arranged for receiving and holding film lengths thereon in an upwardly facing first position;
    feed means for feeding single film lengths onto said film holding means in said first upwardly facing position;
    rotating means for rotating said film holding means into a second position wherein said film faces downward toward the lens of the camera on the photographic axis thereof for exposing the film, and for after exposure, rotating said film holding means back to said first position with the exposed film facing upwardly; and
    transfer means associated with said film holding means for transferring the exposed film from said film holding means to the developing station.

2. A device as in claim 1 wherein said camera is an upright type camera.

3. A device as in claim 1 wherein said film holding means comprises a suction box for holding the film in position, and a movable endless belt providing a film supporting surface.

4. A device as in claim 1 further comprising means for automatically operating the device.

5. A device as in claim 1 wherein said feed means comprises a roll of film associated with an unrolling unit and cutting means for cutting predetermined size film sheets from said roll, and for feeding said predetermined size film sheets to said holding means, in a sequential manner for sequential exposure of the single film sheets in the camera.

* * * * *